INVENTORS
PETER S. BANFF
Vernon Halversen

June 13, 1950 P. S. BANFF ET AL 2,511,559
MACHINE FOR MAKING BANDAGES
Filed Nov. 27, 1946 11 Sheets-Sheet 5

Inventors
PETER S. BANFF
Vernon Halversen
by Fred Gerlach Atty

Patented June 13, 1950

2,511,559

UNITED STATES PATENT OFFICE 2,511,559

MACHINE FOR MAKING BANDAGES

Peter S. Banff and Vernon Halversen, Chicago, Ill., assignors to Presto Bandage Company, Chicago, Ill., a corporation of Illinois Application November 27, 1946, Serial No. 712,522

3 Claims. (Cl. 154—1)

This invention relates to the manufacture of adhesive bandages and packaging of the same for distribution, and it has to do more especially with the production and packaging of bandages of the type comprising an adhesive-coated fabric sheet, which preferably is star-shaped, to the center of which is adhered a disc of cotton gauze.

The principal object of our invention is to devise methods and means for rapidly and economically producing and packaging bandages of the above-indicated character while at all times protecting the bandage material against contamination resulting from human contact, until such time as the bandage may be put to use.

The several novel features of our invention can most readily be explained in connection with the detailed description to follow, and with reference to the accompanying drawings.

In the drawings, of which there are 11 sheets.

Figures 5, 6, 7:
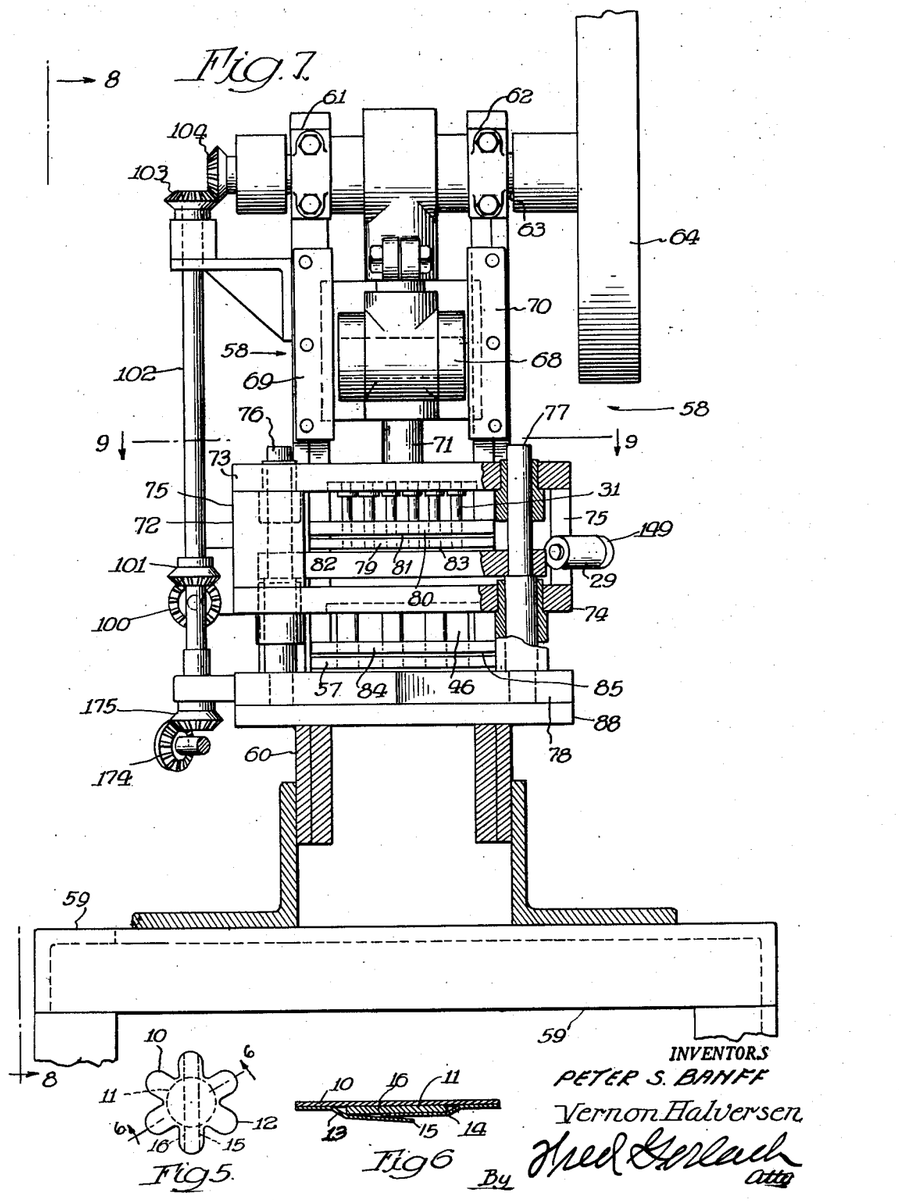
Fig. 5 is a plan view of a bandage with the protective crinoline tape attached.
Fig. 6 is an enlarged cross-section, taken at line 6—6 of Fig. 5, showing the make-up of a bandage, including the removable crinoline tape.
Fig. 7 is a front elevation, partly in section, of the bandage making and packaging machine.

The machine illustrated in the drawings and hereinafter described is designed and constructed to manufacture and package adhesive bandages, one of which is depicted in Figs. 5 and 6. Each bandage comprises a sheet or piece 10 of adhesive fabric, to the center of which is adhered a round disc 11 of cotton gauze, which may or may not be medicated. The sheets 10, are preferably star-shaped, as shown, having in this instance six radially projecting points or fingers 12, and said sheets are coated with a tacky adhesive on one side only, to which side the gauze discs 11 are adhered. That part of the adhesive surface which surrounds disc 11, including fingers 12, is exposed, when the bandage is ready for use, and serves to attach the bandage to the skin area surrounding the injured part. The gauze disc 11 is, of course, applied directly over the wound.

For the purpose of protecting the gauze against contamination after the bandage has been removed from its package, and also to protect the adhesive coating against contact with the package, there is applied to each bandage two pieces of crinoline 13 and 14, which marginally overlap each other adjacent one center line of the bandage. The overlapping edge of crinoline piece 13 is indicated at 15, while the corresponding edge of piece 14 is indicated at 16 in Figs. 5 and 6. Just before the bandage is to be applied, the two pieces of crinoline are peeled off, thus exposing the gauze disc 11 and the adhesive-coated surface of fabric sheet 10 which surrounds the gauze disc.

It will be self-evident that the shape and size of the bandage can be altered at will simply by substituting appropriate stamping dies; and it will also be apparent that a variety of shapes and sizes can be produced simultaneously by the same machine by providing a corresponding variety of stamping dies. Neither the shape nor size of the bandages is in any sense of the essence of this invention; nor is it of the essence of the invention that the gauze disc be centered on the adhesive fabric.

Figures 1, 2:
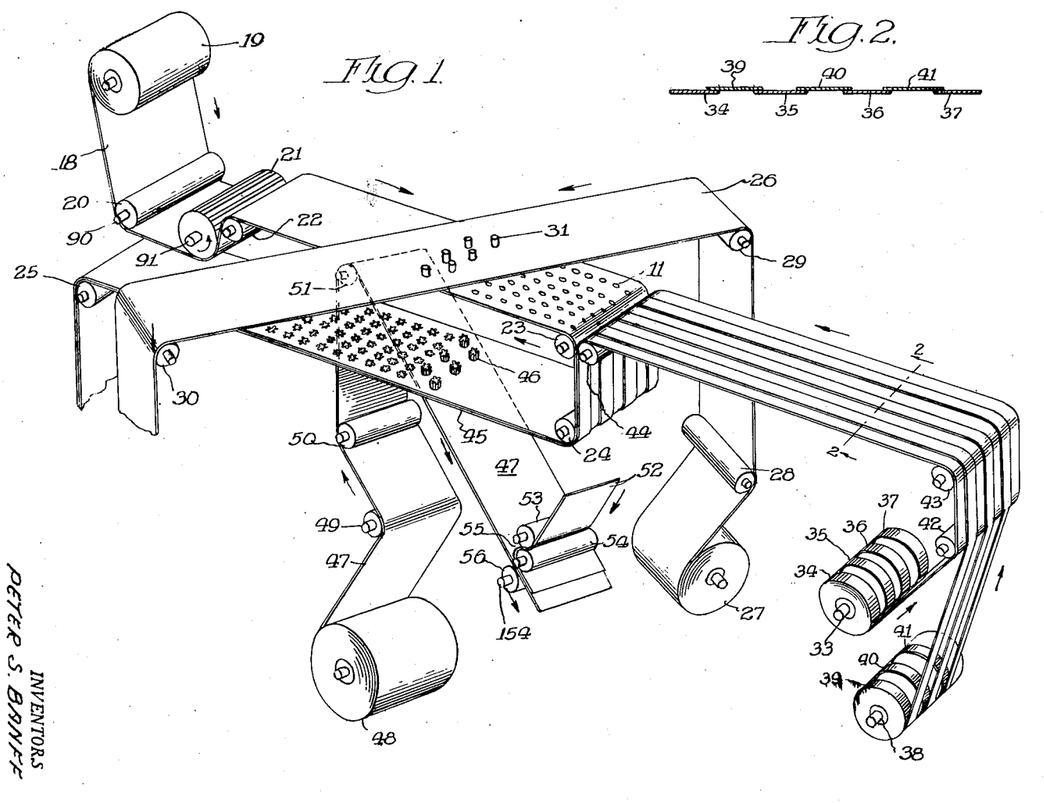
Fig. 1 is a schematic diagram of a bandage making and packaging machine and depicts in a simplified manner the several steps of the process which we prefer to employ in carrying out the invention—omitting, however, the final heat sealing and cutting off operations, which are adequately portrayed elsewhere in the drawings.
Fig. 2 is an enlarged transverse section taken at line 2—2 of Fig. 1, illustrating the marginal overlap of the several strips of crinoline tape being fed to the machine.

In order to expedite a clear understanding of the several functions of our machine we refer first to the schematic diagram of Fig. 1, wherein a web 18 of adhesive coated fabric is fed from a roll 19, under a guide roll 20, in the direction indicated by arrows and is propelled by a continuously rotating serrated feed roller 21 which engages the adhesive surface.

Web 18 passes over a tension roller 22 and a guide roller 23 and then passes downwardly and under a guide roller 24 and thence horizontally and over a feed roller 25 and then downwardly again. The feed roller 25 pulls web 18 and moves the same lengthwise intermittently in uniform measured steps. The tension roller 22 is spring biased and movable laterally so as to keep web 18 taut notwithstanding the continuous rotation of feed roller 21 and the intermittent rotation of feed roller 25.

Extending transversely of adhesive web 18 and overlying the same, in a parallel plane, is a web 26 of cotton gauze, which is fed from a roll 27 over guide rollers 28 and 29 and propelled by a feed roller 30, which is driven intermittently in measured steps, so as to advance the gauze web, step-by-step, in the direction indicated by the arrows, simultaneously with the step-by-step feed movements of the web 18.

At the area of intersection of webs 18 and 26 both said webs pass through a die set having a gang of six circular punches 31 which, upon each downstroke, stamp from the gauze web six circular discs 11 of the bandage, as shown in Figs. 5 and 6. The discs 11 are forced through the die by the punches and are pressed by the punches into firm adherence to the adhesive surface of web 18—the adhesive coating being on the upper surface of web 18 as the latter passes through the aforementioned die set. The forward movements of webs 18 and 26 are co-ordinated with each other and with the movements of punches 31 so that the two webs are stationary when the punches are cutting the gauze and impressing the discs upon the adhesive surface, and so that an optimum amount of gauze and adhesive fabric are moved forwardly at each step. In order to achieve a minimum of waste of both gauze and adhesive fabric the gauze web is arranged to travel at a calculated angle to the adhesive fabric. The selected angle depends in part upon the diameter of the bandages being made and in part upon the spacing thereof. Except for the factor of excess waste, gauze web 26 could run at right angles to web 18 or parallel thereto, and in some cases that can be done without entailing excess waste.

At 33 is a spool carrying four rolls of crinoline tape 34–37 inclusive which are suitably spaced laterally; and at 38 is a second spool carrying three laterally spaced rolls of crinoline tape 39–41 inclusive. The seven crinoline tapes are all of the same width and are passed over guide rollers 42 and 43 in marginally overlapped relation as depicted in Fig. 2. The assemblage of crinoline tapes is passed over a guide roller 44 by which it is brought into intimate face-to-face contact with the coated side of adhesive web 18 on which have been deposited the gauze discs 11. The crinoline tapes are thus caused to adhere to web 18 and are drawn by web 18 around guide roller 24 and feed roller 25—the gauze discs being interposed between web 18 and the crinoline tapes and so spaced laterally that the tapes overlap symmetrically with respect to the centers of the discs, as depicted in Figs. 5 and 6.

Between guide roller 24 and feed roller 25, the span 45 of assembled materials, including web 18 and the seven crinoline tapes with interposed gauze discs, passes through a second die set which includes a gang of six star-shaped punches 46 which, upon each downstroke, punches out six finished bandage units as depicted in Figs. 5 and 6. Punches 46 operate simultaneously with punches 31, and the feed of the material is so regulated that the gauze discs 11 are centered with the star-shaped punches—unless, as in certain cases, it may be desired to position the gauze discs off center.

The star-shaped punchings constituting the finished bandages are forced through the die plate of the lower die set by punches 46 onto a cellophane ribbon 47 having a horizontal stretch 47' which underlies span 45 and extends angularly thereto. The cellophane ribbon 47 is fed from a roll 48 around guide rollers 49, 50 and 51 in the direction indicated by the arrows and is moved intermittently in measured steps of such length as to result in approximately spacing the bandages on the cellophane ribbon.

A second cellophane ribbon 52, of the same width as ribbon 47, is fed between a guide roller 53 and a pressure roller 54 into face-to-face contact with cellophane ribbon 47, as depicted at 55, and the two ribbons are pressed together and driven conjointly by a drive roller 56 which rotates intermittently. The bandages riding on the top surface of cellophane ribbon 47 enter the bight between rollers 54 and 56 and are thus enclosed between the two cellophane ribbons. Thereafter the two cellophane ribbons are welded together by heat and pressure, and the resulting composite strip is cut into units, each containing six bandages. The welding and cutting means are not included in Fig. 1 but are adequately illustrated in other figures of the drawings.

For the purpose of describing the actual machine reference will be made first to Figs. 3, 4 and 7 to 11 inclusive. From those figures it will be seen that the machine comprises, among other components, a punch press 58 mounted on a stand 59 made of structural steel shapes welded together and having an area, as viewed in Fig. 9, large enough to accommodate the press and other parts exterior thereof. The punch press 58 includes a massive frame 60 having bearings 61 and 62 at the top in which is journaled a crankshaft 63 to one end of which is keyed a heavy flywheel 64—the latter being connected by a belt 65 to the drive pulley of an electric motor 66, which is mounted on a bracket 67 secured to frame 60. A crosshead 68 is reciprocable vertically in guides 69 and 70 by crankshaft 63 and is adapted to engage the shank 71 of a dual die set 72 which is, in effect, two die sets in superposed relation, having an upper punch plate 73 and a lower punch plate 74, tied together by means of suitable tie blocks 75 which serve to hold the two punch plates in spaced relation. This is most clearly shown in Fig. 10. The six circular punches 31, shown in Fig. 1, are carried by punch plate 73, and the six star-shaped punches 46, also shown in Fig. 1 are carried by punch plate 74. It is to understood that the two punch plates with their respective punches move up and down in unison. They are held in alignment by guide pins 76 and 77, which are anchored to the base plate 78 of the dual die set. The die plate which co-operates with punches 31 to stamp out the gauze discs 11 is identified by reference numeral 79, and above said die plate is a stripper plate 80. Between die plate 79 and stripper plate 80 is a slot 81 through which passes the web 26 of cotton gauze. This web is not shown in Fig. 10, but is clearly indicated in Fig. 9. The purpose of stripper plate 80 is to prevent the web of cotton gauze from clinging to punches 31 on the upward movements thereof.

Below die plate 79 is a plate or slab 82 which is fixedly attached to guide pins 76 and 77 and functions as a table over which passes, through a slot 83, the web 18 of adhesive-coated fabric, the upper surface of which carries the adhesive coating. It will be apparent from inspection of Fig. 10 that the gauze discs 11 are pressed onto the adhesive surface of web 18 by punches 31.

Figure 3:
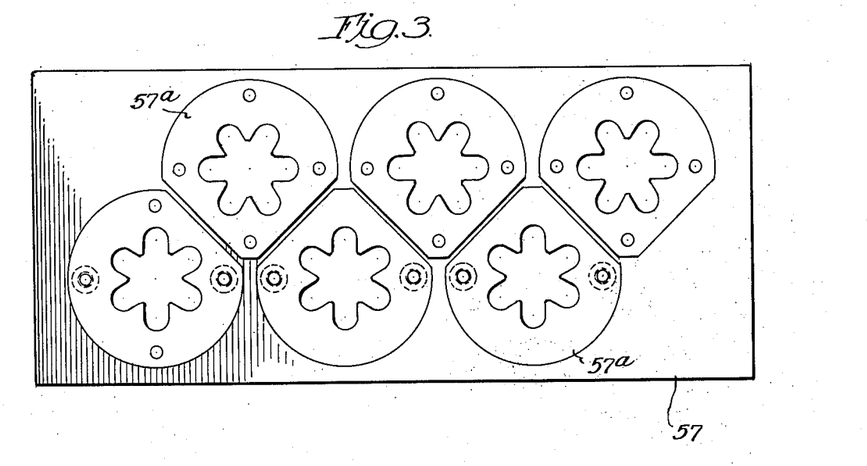
Fig. 3 is a plan view of a die plate including six stamping die inserts which, in co-operation with the correspondingly formed punches, serve to stamp out the star-shaped bandages.

The die plate which co-operates with star-shaped punches 46 is identified by reference numeral 57 and is shown in plan view in Fig. 3. The star die inserts, per se, are identified by reference numeral 57a—being, for convenience, made up as separate parts and inserted in die plate 57.

Figure 10:
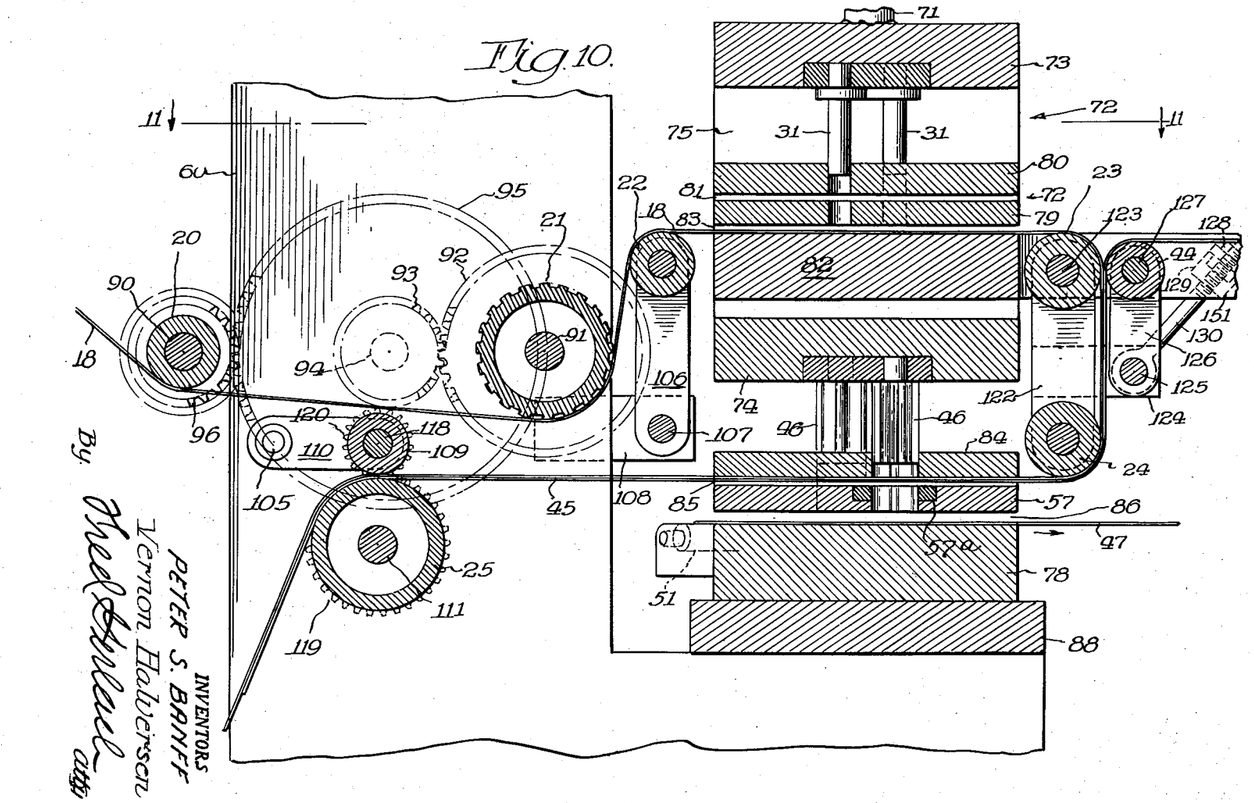
Fig. 10 is a sectional view taken at line 10—10 of Fig. 11.
Figure 11:
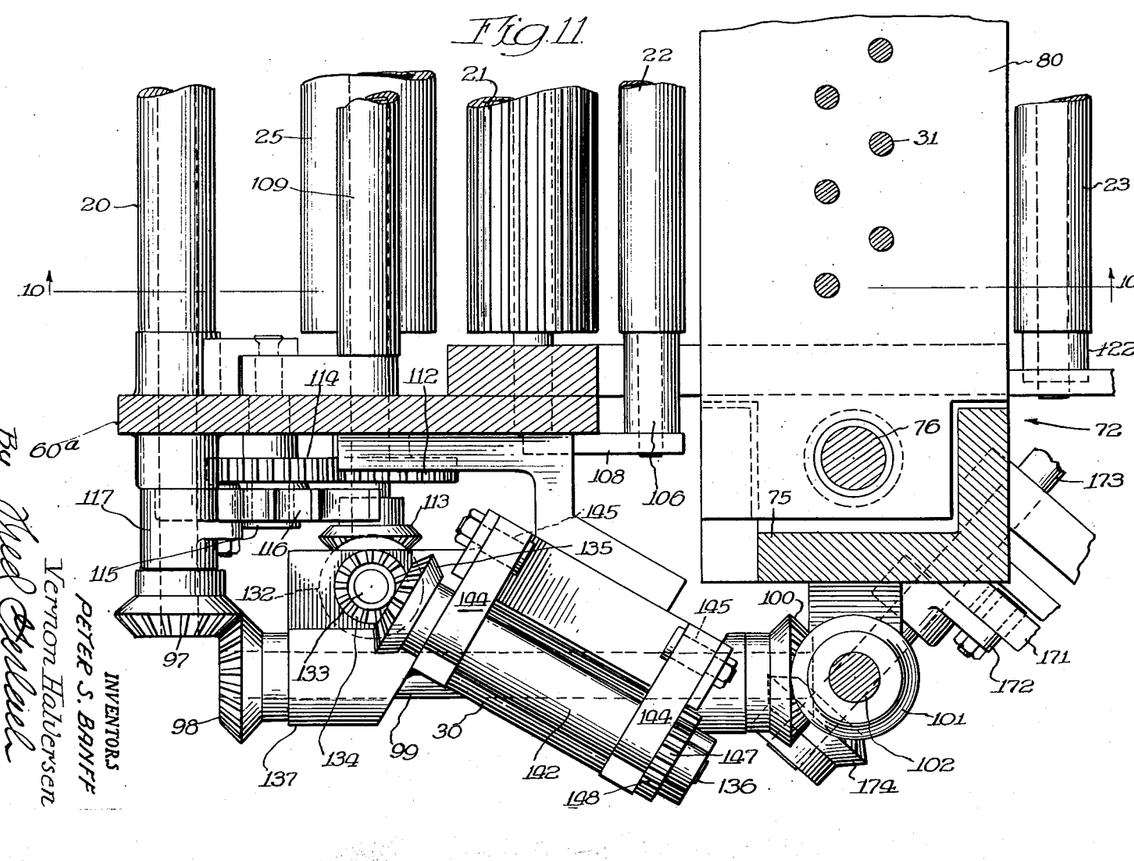
Fig. 11 is a view taken at 11—11 of Fig. 8 and Fig. 10.

Located above die plate 57 is a stripper plate 84, separated from the die plate by a narrow space forming a slot 85 through which passes the span 45 of assembled materials comprising web 18, to which are adhered the gauze discs 11 and the seven crinoline tapes. Stripper plate 84 performs the same kind of function as stripper plate 80.

Below die plate 57 and spaced therefrom to form a slot 86, die base plate 78 provides a table over which passes the cellophane ribbon 47.

The bandage cut-outs are forced through die plate 57 by punches 46 and drop onto cellophane ribbon 47 by which they are carried away, as previously explained with reference to Fig. 1.

Die set 72 is bolted or otherwise secured to the press platen 88 and is easily removable to enable quick withdrawal and replacement of the punches and die plates.

The roll 19 of adhesive fabric is carried by a pair of brackets 89 secured to frame 60 (see Fig. 3).

Guide roller 20 is loosely mounted on a shaft 90, which is journaled in frame members 60a and 60b.

The serrated feed roller 21 is keyed to a shaft 91 which is journaled at its two ends and provided at one end with a spur gear 92 which meshes with an idler pinion 93 which is mounted on stub shaft 94 together with an idler gear 95 to which it is drivingly connected.

Gear 95 is meshed with a pinion 96 which is keyed to shaft 90. A bevel gear 97 keyed to the other end of shaft 90 is meshed with a bevel gear 98 which is keyed to a cross-shaft 99, to the other end of which is keyed a bevel gear 100 which, in turn, is meshed with a bevel gear 101 secured to a vertical shaft 102.

To the upper end of shaft 102 is keyed a bevel gear 103 which is meshed to a bevel gear 104 keyed to crankshaft 63. It will be seen that feed roller 21 is driven continuously by the gear train comprising gears 92, 93, 95 and 96 which, in turn, is driven by shafts 90, 99 and 102, which are interconnected by bevel gears 97, 98, 100 and 101 and coupled to crankshaft 63 by bevel gears 103 and 104.

It would be undesirable to operate feed roller 21 intermittently, but it is necessary to operate feed roller 25 intermittently because the webs passing through the die slots 83 and 85 must be stationary during the piercing operations. For that reason means must be provided for taking up the slack in the web between feed rollers 21 and 25 during the periods between movements of roller 25; and to that end tension roller 22 is mounted on a pair of arms 106 (see Fig. 10) which are pivotally mounted on a shaft 107 supported by brackets 108 which, in turn, are secured to frame 60. A spring, not shown, biases arms 106 counterclockwise, as viewed in Fig. 10, thereby causing roller 22 to take up the aforementioned slack.

A pressure roller 109 bears against the scrap stock running over feed roller 25, thus holding it in frictional engagement with said feed roller, and is mounted on a shaft 118 carried by a pair of arms 110 which are pivoted at 105 and spring-biased clockwise, as viewed in Fig. 10, so as to urge roller 109 downwardly.

Figure 12:
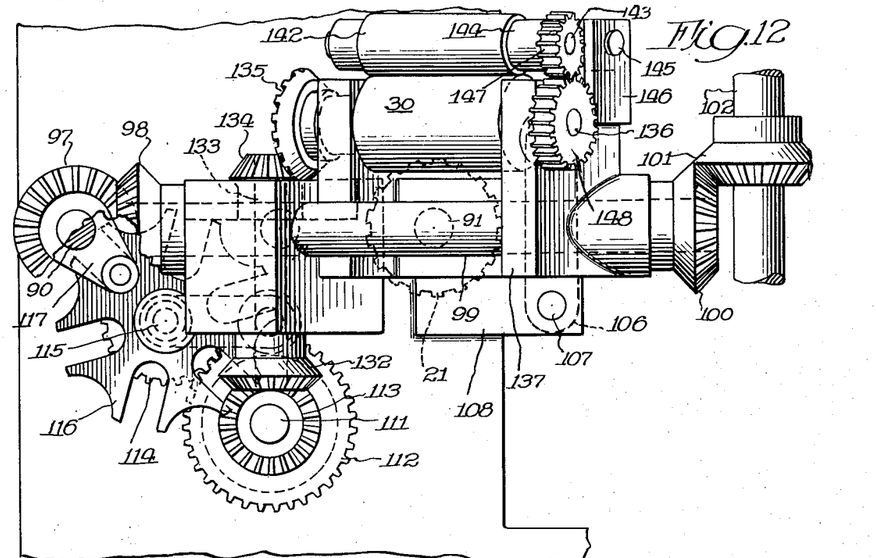
Fig. 12 is an enlarged detail of a portion of the mechanism shown in Fig. 8.

Feed roller 25 is mounted on a shaft 111 to which are keyed a spur gear 112 and a bevel gear 113. Spur gear 112 is meshed with a spur gear 114 (see Fig. 12) which is mounted for rotation on a stub shaft 115, together with the driven member 116 of a Geneva drive—said driven member being drivingly coupled to spur gear 114. The driving member 117 of said Geneva drive is keyed to shaft 90 which rotates continuously. Shaft 115 makes one revolution for each six revolutions of shaft 90, and the rotation of shaft 115 consists of six steps per revolution, each of sixty degrees, with a rest period following each step. The shaft 118 which carries pressure roller 109 is driven from shaft 111 by means of a pair of spur gears 120 and 119 which are keyed to said shafts, respectively—see Fig. 9.

Because it is desirable that the gauze discs 11 be centered as accurately as possible on the adhesive sheets 10 (see Fig. 5) and because there is apt to be some variation, from time to time, in the degree of stretch of the adhesive fabric, such as would have the effect of introducing error in the centering of the discs, the guide roller 24 is suspended on a pair of arms 122 (see Fig. 10) which are pivotally mounted at 123 concentrically with guide roller 23. Each of the two arms 122 has a lateral extension 124 welded thereto; and bridged between said extensions 124 is a shaft 125 which provides a pivotal support for a pair of upstanding arms 126, across the upper ends of which are connected a shaft 127 on which is mounted guide roller 44. A coil spring, not shown, biases arms 126 counterclockwise, as viewed in Fig. 10, thus providing radial pressure between rollers 23 and 44. A pair of inclined eyebolts 130 are connected each at one end to shaft 125 and anchored by means of nuts 128 to angle brackets 129 on the frame of the machine. It will be seen that arms 122 can be rotated about shaft 123 by pulling up or letting off on eyebolts 130, and that by so doing guide roller 24 can be moved in such manner as to correct any misalignment of the gauze discs with respect to the centers of star punches 46. The same means will also serve for offsetting the gauze discs with respect to the centers of the bandages in event it is desired to effect such offsetting.

Drive mechanism for gauze web

Figure 8:
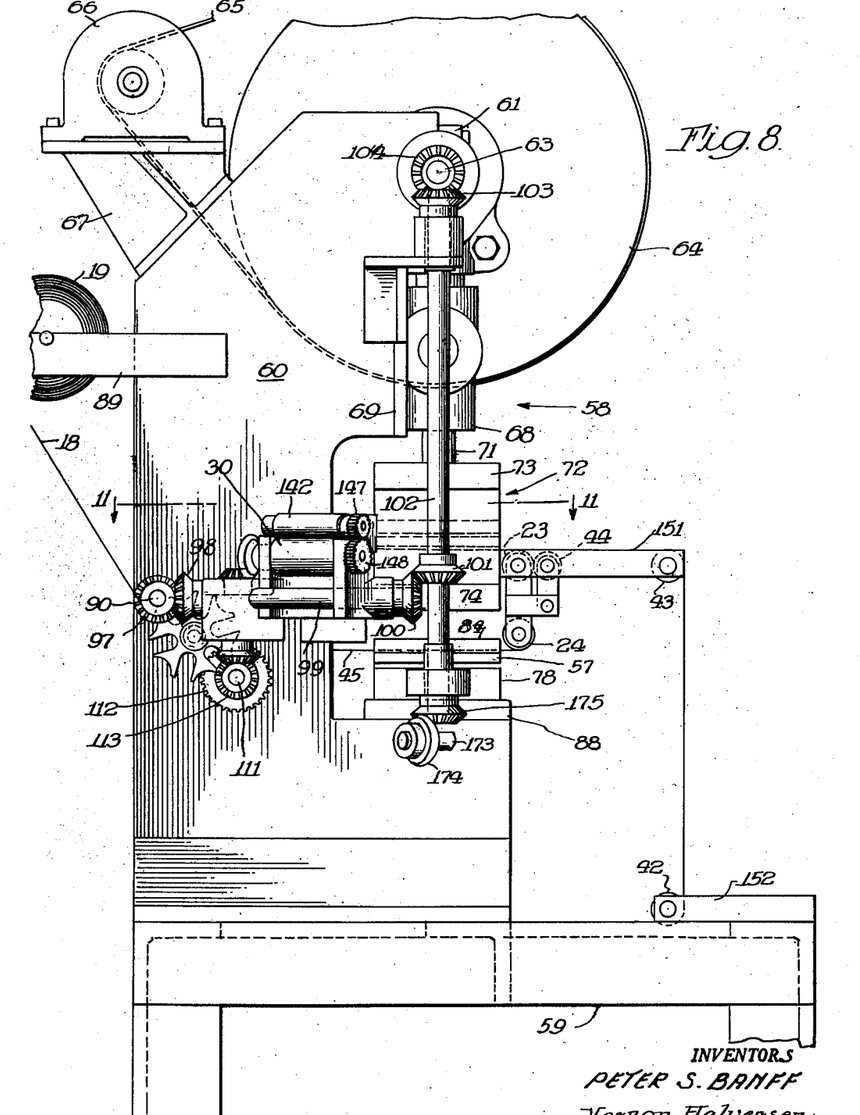
Fig. 8 is a side elevational view taken at line 8—8 of Figs. 7 and 9.
Figure 9:
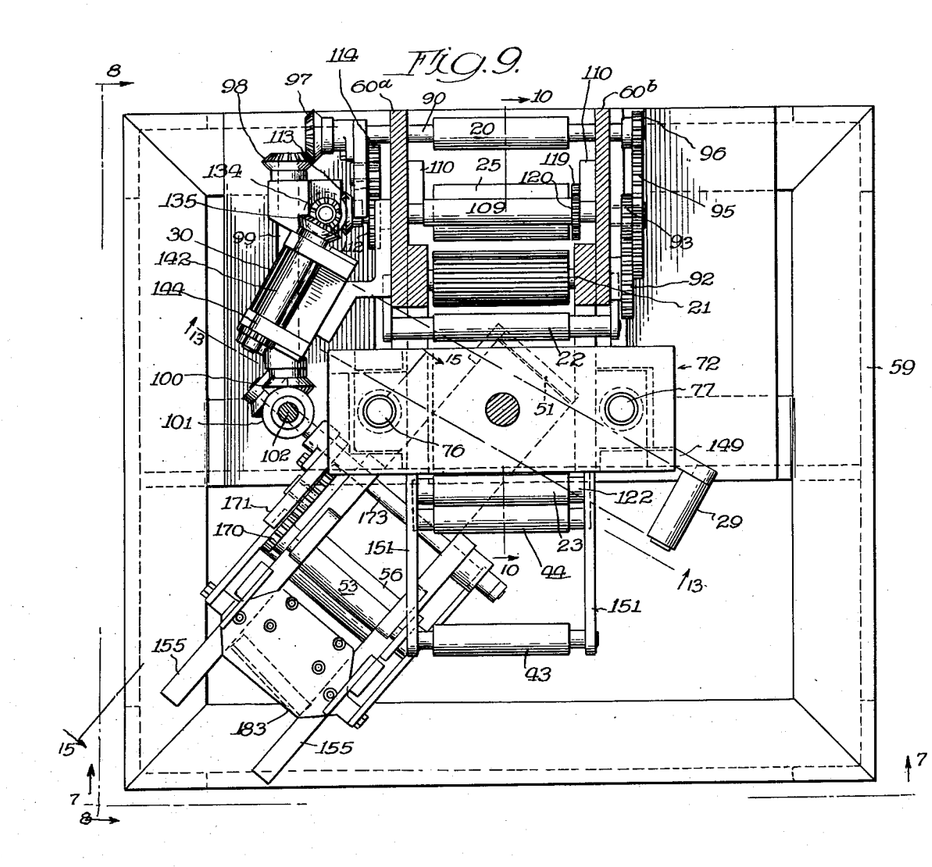
Fig. 9 is a view taken at line 9—9 of Fig. 7.
Figures 13, 14:
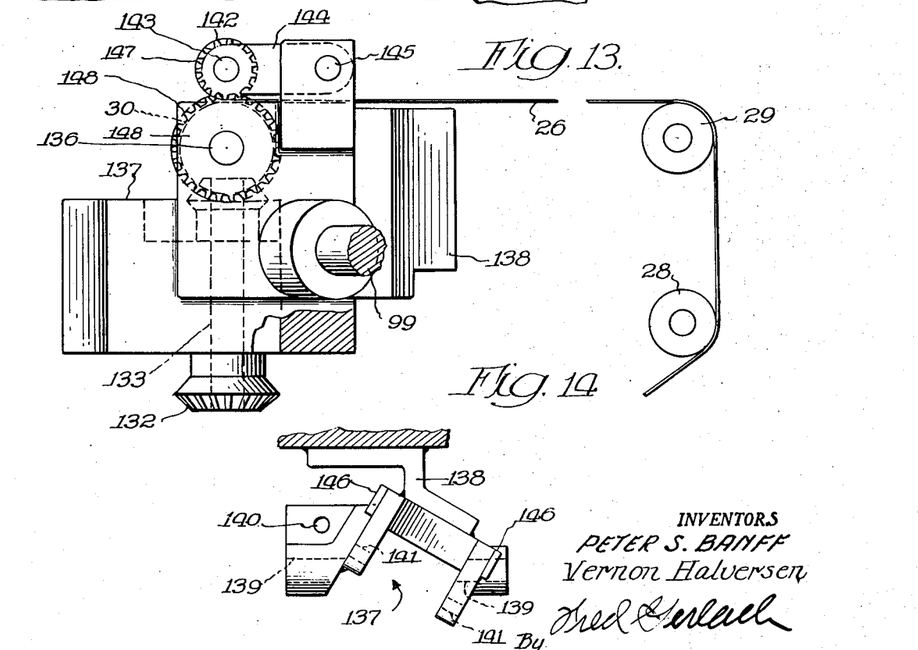
Fig. 13 is a detail of construction as viewed at line 13—13 of Fig. 9.
Fig. 14 is a detail of a supporting bracket and bearing.

The drive mechanism for intermittently feeding the web 26 of cotton gauze is depicted on an enlarged scale in Figs. 11-14 inclusive, and is also shown on a smaller scale in Figs. 8 and 9. The most convenient starting point for a description of this drive is the bevel gear 113, which is rotatable with spur gear 112 and thus driven intermittently by the previously described Geneva drive comprising driven member 116 and driving member 117. Meshed with bevel gear 113 is a bevel gear 132 which is keyed to a vertical shaft 133 which carries at its upper end a bevel gear 134—the latter being meshed with a bevel gear 135, which is keyed to a shaft 136 which carries feed roller 30. Shafts 99, 133 and 136 are all supported by a bearing bracket 137, a plan of which is shown in Fig. 14. This bracket is welded through the medium of an angle iron 138 to the side of press frame 60 and is bored at 139, 140 and 141 to provide bearings for shafts 99, 133 and 136 respectively.

Positioned above feed roller 30 and bearing down on gauze web 26 is a pressure roller 142. This roller is mounted on a shaft 143 which is journaled at its ends on two arms 144, which are pivotally mounted on stub shafts 145 supported by uprights 146 forming parts of brackets 137. Shafts 143 and 136 are interconnected by spur gears 147 and 148 whereby pressure roller 142 is positively driven.

Guide roller 29 is carried by a bracket 149 which is attached to the dual die set 72. This roller and bracket are shown in Figs. 7 and 9; but guide roller 28 and gauze roll 27 are not shown otherwise than in Fig. 1.

Since both the adhesive fabric 18 and the cotton gauze 26 are advanced through the die set by the same Geneva drive, it will be evident that they move simultaneously and come to rest simultaneously.

The gauze webbing from which the discs 11 have been punched is waste material, and the same is true of the composite webbing from which the bandages have been stamped.

Feed mechanism for crinoline tapes

The seven crinoline tapes 34-37 and 39-41 inclusive are gripped between roller 44 and the adhesive face of web 18 and are fed step-by-step simultaneously with the lengthwise intermittent movements of web 18. Guide roller 42 is carried by a pair of arms 152 (see Fig. 8) which are welded to the stand 59. The spools 33 and 38 which support the several rolls of crinoline tape are mounted below the top of stand 59 and are not shown otherwise than in Fig. 1.

Feed mechanism for cellophane ribbons

Figure 18:
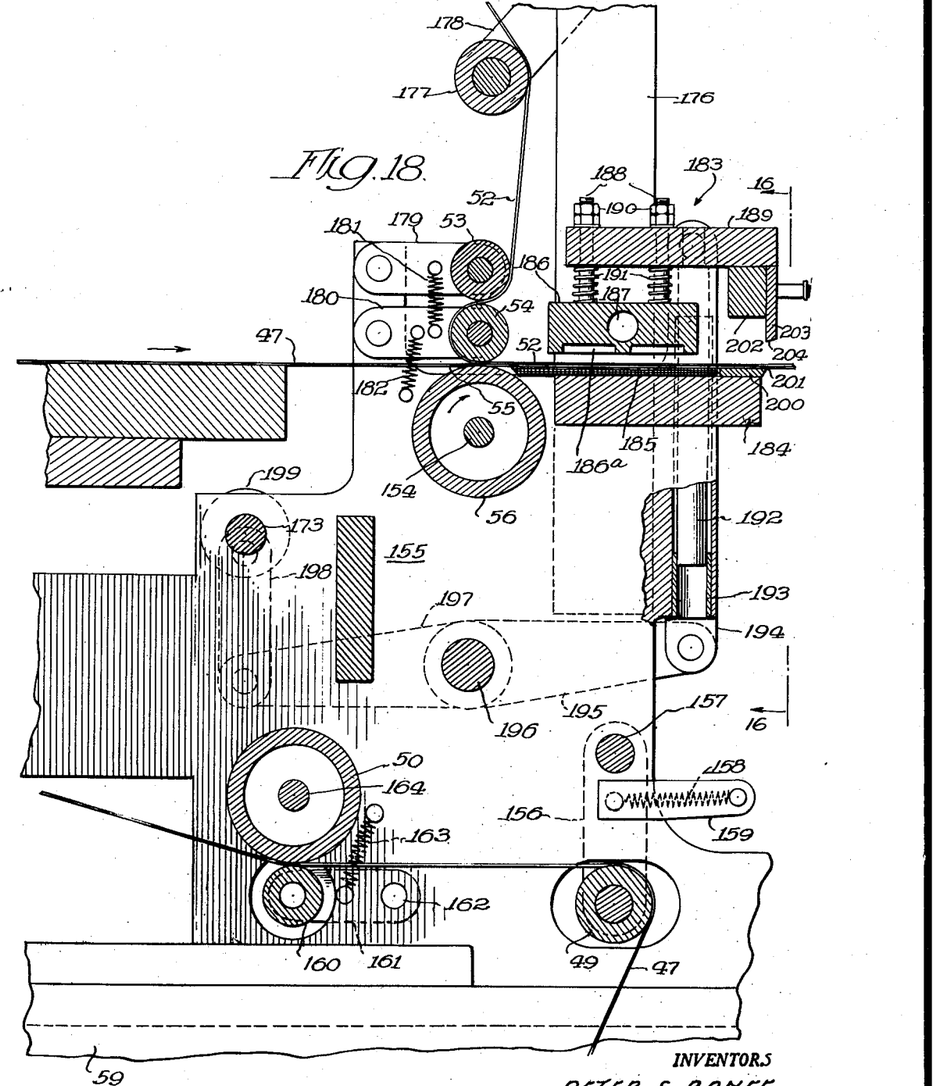
Fig. 18 is a sectional view taken at line 18—18 of Fig. 17.

The two cellophane ribbons 47 and 52 are fed from rolls 48 and 153 (see Fig. 15) and are propelled intermittently by feed roller 56 which is mounted on a shaft 154 (see Fig. 18), journaled at its ends in the side walls of a frame 155 which is supported by stand 59. As can be seen from Fig. 9, frame 155 is disposed at an angle of about 41 degrees to the line of travel of the adhesive fabric 18 and to the line of travel of the seven crinoline tapes; and the two cellophane ribbons 47 and 52 move at the same angle (41 degrees) to the aforementioned line of travel of the adhesive fabric and tapes.

Figure 17:
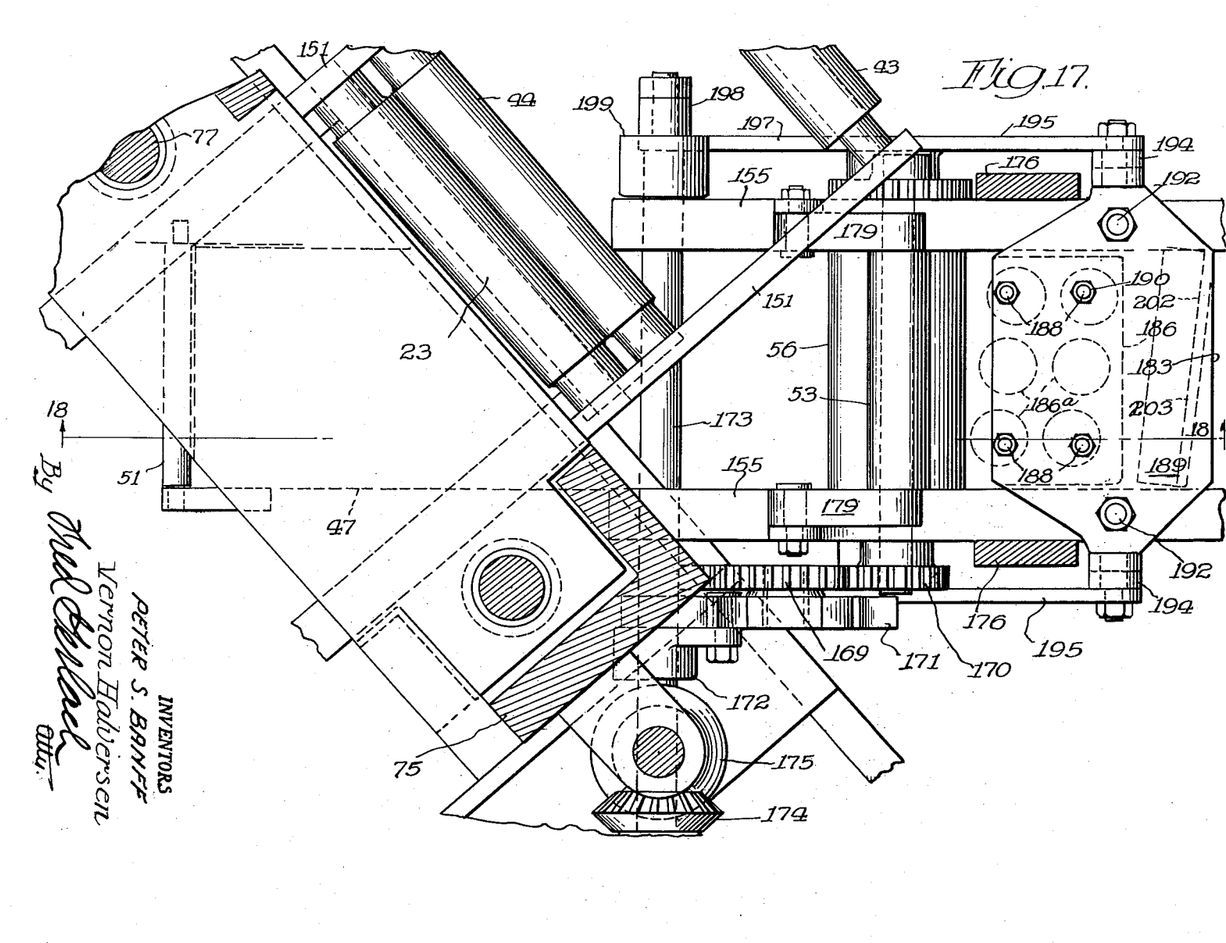
Fig. 17 is a plan view, partly in section, of the portion of the machine illustrated in Fig. 15.

The cellophane ribbon 47 leaving roll 48 passes over guide roller 49, suspended on the two arms 156 which are pivotally mounted at their upper ends on a shaft 157 journaled in frame 155—see Fig. 17. Arms 156 are biased by a coil spring 158, one end of which is anchored to an arm 159 attached to frame 155. Roller 49 functions both as a guide roller and as a means for tensioning cellophane ribbon 47.

Figures 15, 16:
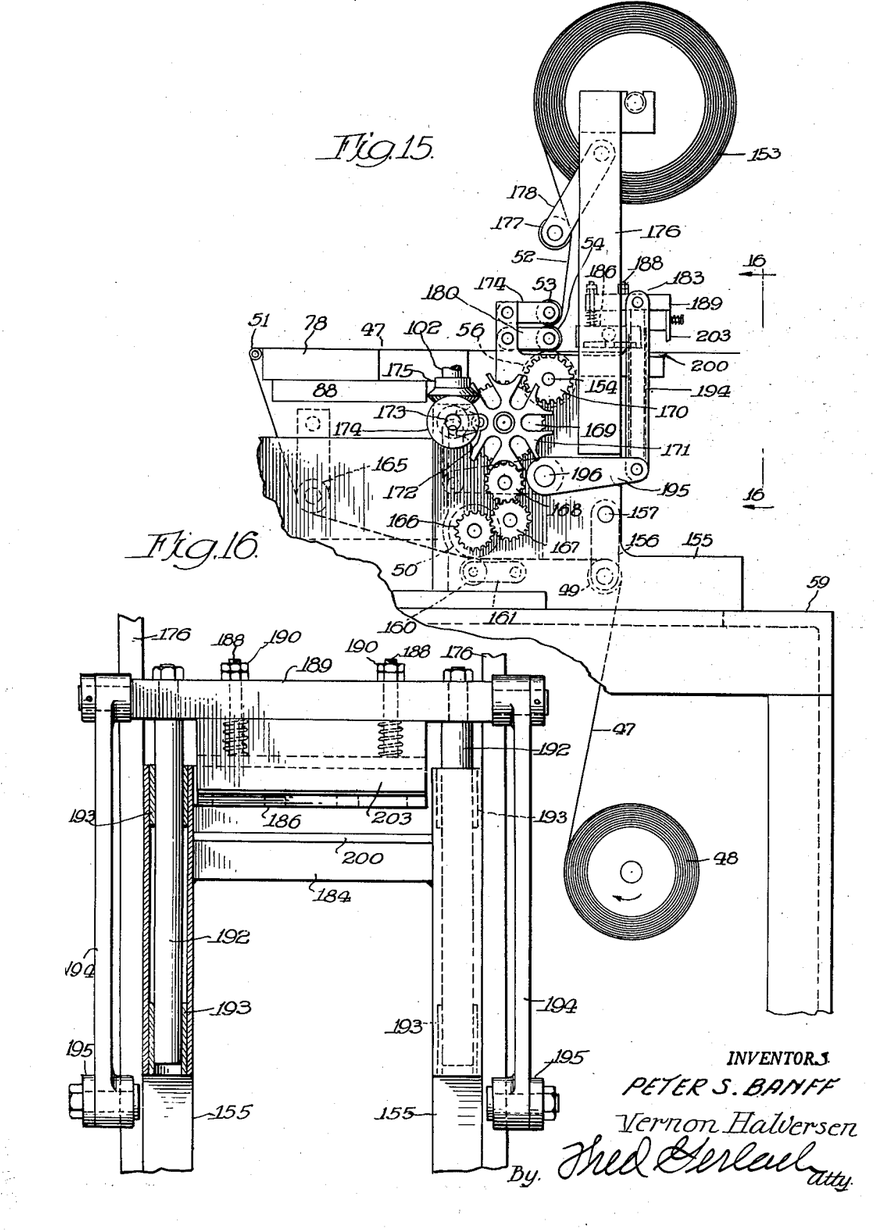
Fig. 15 is an elevational view, taken at line 15—15 of Fig. 9, of that part of the machine wherein the cellophane bandage-containing packages are sealed and cut into units.
Fig. 16 is a fragmentary elevational view, partly in section, taken at line 16—16 of Figs. 15 and 18.

A pressure roller 160 is journaled on a pair of arms 161, which are pivoted at 162 biased upwardly by a coil spring 163 to press cellophane ribbon 47 against the periphery of roller 50—which latter is carried by a shaft 164 which is journaled in the side walls of frame 155. After passing between rollers 50 and 160, the cellophane ribbon 47 is engaged by a tension roller 165—shown only in Fig. 15—and then traverses guide roller 51 which guides ribbon 47 through slot 86 and over slab 87 of die set 72—see Figs. 10 and 15. Roller 50 is an intermittently rotating feed roller as well as a guide roller, and its shaft 164 is connected through a train of gears with shaft 154 of feed roller 56. The two feed rollers 50 and 56 have the same peripheral speed and, therefore, serve to advance ribbon 47 equally. The train of gears interconnecting said feed rollers is shown in Fig. 15 and comprises gears 167 to 170 inclusive. These are mounted on stub shafts attached to one side wall of frame 155. Spur gear 169 is the driver of the train of gears just enumerated and is coupled to and driven by the driven member 171 of a second Geneva drive. The driving member of said second Geneva drive is identified by reference numeral 172 and is keyed to a shaft 173 to one end of which is keyed a bevel gear 174 which meshes with a bevel gear 175 secured to the lower end of shaft 102—see Figs. 7 and 8. Shaft 173 and Geneva driving member 172 are rotated continuously and each revolution thereof causes a 60 degree rotation of driven member 171 and gear 169—the rotational movements of said driven member and gear being intermittent because of the nature of the Geneva drive. Inasmuch as Geneva drives are well known mechanisms for translating continuous rotary motion into intermittent rotary motion it is considered unnecessary to explain in this specification the mode of operation thereof.

The roll 153 of cellophane ribbon is supported for rotation on a pair of uprights 176 which are attached to frame 155; and the cellophane ribbon 52 is fed downwardly over a tension roller 177 which is carried by a pair of arms 178 pivotally connected to uprights 176. Said ribbon then passes downwardly and between guide rollers 53 and pressure roller 54 and into the bight between rollers 54 and 56, as shown schematically in Fig. 1. Rollers 53 and 54 are carried by arms 179 and 180 respectively, which are pivotally connected to frame 155. A tension spring 181 interconnects arms 179 and 180 and pulls rollers 53 and 54 into pressing engagement with ribbon 52; and a tension spring 182 acts downwardly on arms 180 and pulls roller 54 into pressing engagement with the two sheets of cellophane ribbon in the bight of rollers 54 and 56.

To the right of rollers 54 and 56, as viewed in Fig. 17, cellophane ribbon 52 is superimposed upon cellophane ribbon 47 with the bandages of Figs. 5 and 6 interposed therebetween; and the two ribbons, together with the interposed bandages, move to the right in intermittent measured steps, as viewed in Fig. 17.

Heat sealing and cutting off operations

The cellophane ribbon employed is of the kind which welds under heat and pressure, and the two ribbons are welded together at points between adjacent bandages as they pass through a die 183, which will now be described.

Said die comprises a bed 184 constituting an integral part of frame 155 and having a flat top surface on which is mounted a heat resistant fiber pad upon which rests the strip comprising the two sheets of cellophane ribbon with the interposed bandages.

Disposed above die bed 184 is a welding iron 186 having a cavity 187 in which is inserted an electric heating element which functions to maintain welding iron 186 at a temperature sufficient to effect the desired welding operation.

The bottom of welding iron 186 has six circular recesses 186a which are positioned to register with the bandages in such manner that the surrounding horizontal under surface of the welding iron engages the top surface of ribbon 52 at areas intermediate of the bandages, so that each bandage will be enclosed within an individual cellophane envelope or cell.

Welding iron 186 is suspended on four bolts 188 which extend through apertures in a crosshead 189 in which said bolts are slidably fitted. Said bolts are anchored to crosshead 189 by means of nuts 190, and a coil spring 191 is placed around each bolt between crosshead 189 and the top surface of welding iron 186. Said springs function as cushions and determine the amount of pressure exerted by the welding iron on the cellophane ribbons. They should be so selected and adjusted as to produce enough pressure to effect a good weld without greatly exceeding that amount of pressure. The temperature at which the welding iron is maintained should be in conformity with the softening temperature of the cellophane being used and should be adjusted to a value which is found to produce a satisfactory weld.

Two parallel guide pins 192 are affixed to crosshead 189 and are slidably fitted in bushings 193 in the frame 155. The crosshead is reciprocable vertically, together with the guide pins, and is kept in alignment by the latter.

To each end of the crosshead 189 there is pivotally attached a connecting rod 194, each of which, in turn, is pivotally connected at its lower end to one end of two lever arms 195, respectively, which are keyed to a shaft 196. One of said lever arms 195 is integral with another lever arm 197 to which is pivotally connected a link 198, the upper end of which is connected to a crank 199 on shaft 173. It will be evident that each revolution of shaft 173 brings about a complete cycle of operation of crosshead 189 and welding iron 186.

The strip comprising ribbons 47 and 52 is fed through the welding die, synchronously with the reciprocations thereof, by feed roller 56 in successive equal steps, the length of which is so regulated as to position within the welding die a fresh group of six bandages for each step. The heat from the welding iron and the pressure exerted thereby on the cellophane ribbons causes them to become welded together throughout the area contacted by the welding iron.

Attached to the upper surface of die bed 184 at the discharge end thereof is a cutter bar 200 having a cutting edge at 201; and attached to crosshead 189, through the medium of a mounting block 202 is a second cutting bar 203 having a cutting edge 204 in co-operative alignment with cutting edge 201. Upon each downstroke of crosshead 189 the aforementioned cutting edge shears off a length of stock comprising a group of six bandages enclosed between two sheets of cellophane. The six-bandage units thus produced are non-rectangular parallelograms in form because the shear blades 200 and 203 have to be set at an angle, as shown, (see Fig. 17) in order to conform to the arrangement of the bandages—the transverse rows of which do not extend at right angles to the line of travel of the cellophane ribbons.

Figure 4:
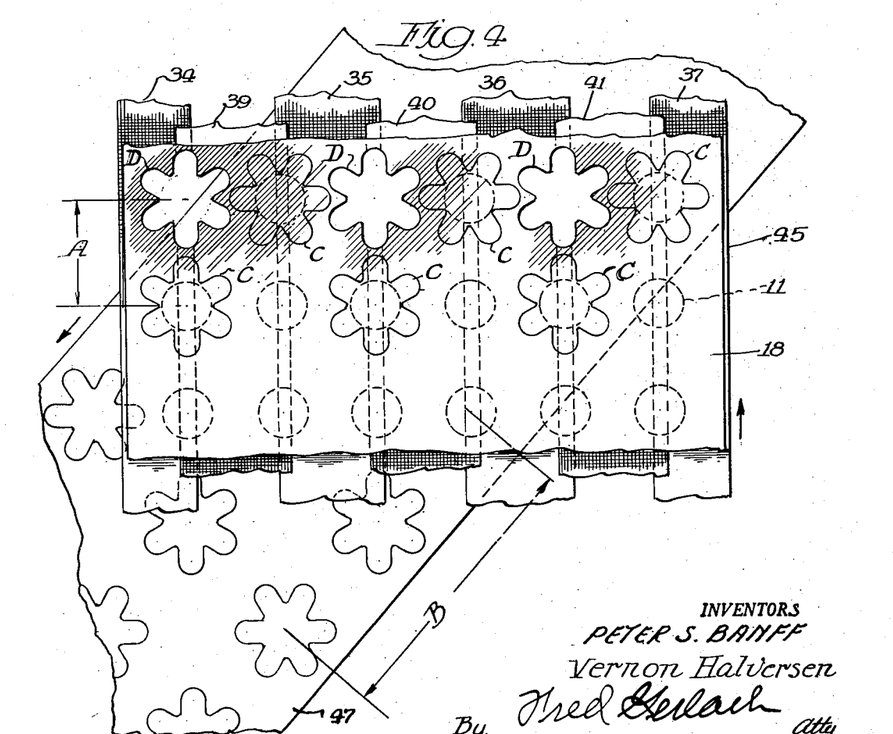
Fig. 4 is a detail view depicting the passage of the composite web, comprising the adhesive-coated fabric, gauze discs and crinoline tapes, through the die-set of which the die plate of Fig. 3 is a part—also showing the cellophane ribbon on which the bandages are deposited as they drop from the die-set, and illustrating the final step in the making of the bandages, per se—which step is followed by the packaging operations.

In Fig. 4 there is shown a portion of the composite strip comprising the adhesive-coated web 18 and the seven attached crinoline tapes 34–37 and 39–41 inclusive, together with the interposed gauze discs 11, at a position inside die set 72 just below the star-shaped punches 46. And below said composite strip is shown a portion of the cellophane ribbon 47 on which has been deposited several of the star-shaped bandages. The direction of movement of the composite strip and the direction of movement of the cellophane ribbon are both indicated by arrows. The length of each forward movement of the composite strip is indicated by the dimension A, and the length of each forward movement of the cellophane ribbon is indicated by the dimension B. This brings about a uniform distribution of the bandages on the cellophane ribbon according to the pattern depicted in Fig. 4; and it will be apparent from the layout why the cutting edges 201 and 204 are set at an angle to the path of the cellophane ribbons.

The star-shaped outlines marked C in Fig. 4 indicate bandages which are about to be stamped out, while the similar outlines marked D indicate perforations in the composite strip formed as a result of the immediately preceding stamping operation.

While we have referred throughout this specification to particular materials, namely; adhesive-coated fabric, cotton gauze, crinoline tape and cellophane ribbon, we wish it to be understood that those terms are to be construed as including all equivalent materials. For example, the adhesive-coated webbing 18 is preferably a woven fabric, but not necessarily so. It could, for instance, be paper or cellophane or some other suitable material. Instead of cotton gauze there might be substituted some other equivalent material such, for example, as linen gauze or pressed felt. Instead of crinoline tape there might be substituted an unstiffened gauze or cellophane tape or any other material which will serve the purpose. And instead of cellophane ribbons there could be substituted another material as, for example, a suitably treated paper. In order to avoid confusion and uncertainty we have refrained from the employment of vague or all-inclusive terminology in referring to the various bandage materials in the appended claims; but we wish it clearly to be understood that we mean to include all substitute materials within the scope of the claims. Manifestly, the present invention is in no wise limited as respects the materials entering into the make-up of the bandages. Neither is the invention limited as respects the number of bandages produced at each stroke of the press. We have shown and described a machine which makes six bandages per press stroke; but this is purely by way of example and it will be self-evident that the machine could readily be constructed to produce any number of bandages per stroke, either more or less than six, within the limits of the space available. Moreover, it will be evident that the assembled webs of cellophane ribbons with interposed bandages could be run through a slitter and thus cut into long strips of single-bandage width—which strips could be wound into rolls of a size suitable to the needs of large consumers.

While the above-described machine represents the preferred embodiment of our invention, it will be apparent to those skilled in the art that there are many possible alternative arrangements and modifications within the scope and purview of the invention, and we do not wish to be limited except as indicated by the terms of the appended claims.

Having described our invention, what we claim as new and wish to secure by Letters Patent is:

1. The combination in a bandage-making machine, of a dual die set comprising an upper die and a lower die in superimposed relation and interconnected for simultaneous operation, means for feeding a web of gauze through said upper die in intermittent uniform steps, means for feeding a web of adhesive-coated fabric underneath said upper die, said upper die being operative to punch discs of gauze out of said gauze web and to press said discs upon the adhesive surface of said fabric at predetermined spaced points, means for guiding said fabric web with the gauze discs thereon through said lower die, means for guiding a plurality of parallel crinoline tapes in a path parallel to that of said fabric web and into adhering contact with the adhesive surface of said fabric, said crinoline tapes being marginally overlapped edgewise, said crinoline tapes being joined to said fabric at a point anterior to its entry into said lower die so that said tapes pass through said lower die with the fabric web and form protective coverings for both the adhesive coating and the gauze discs thereon, said lower die being operative to stamp out pieces of the composite web passing therethrough, each of which pieces constitutes an adhesive bandage having a centered gauze disc and a pair of marginally overlapped pieces of crinoline which completely cover the gauze disc and the adhesive surface surrounding said disc.

2. The combination in a bandage-making machine, of a punch press, an upper die set and a lower die set mounted one above the other in said press and operable thereby, said die sets each comprising a die plate and a punch plate, said punch plates being connected together for simultaneous vertical reciprocation, a gang of punches carried by said upper punch plate, a second gang of punches carried by said lower punch plate, means for guiding a web of gauze through said upper die set and for feeding said web therethrough intermittently in uniform steps, means for guiding a web of adhesive-coated fabric underneath the upper die plate and for feeding said fabric web intermittently in uniform steps, the punches of said upper die set being operative to punch gauze discs out of said gauze web and to press said gauze discs upon the adhesive surface of said fabric, the feeding movements of said fabric and gauze webs occurring simultaneously, means for guiding said fabric web with the gauze discs thereon through said lower die set, the punches of said lower die set being operative to punch out pieces of said fabric, and means for adjusting the length of the fabric web between the two die sets so that the gauze discs can be centered on the punchings produced by the lower die set.

3. The combination in a bandage-making machine, of a punch press having a crankshaft and a crosshead connected to said crankshaft and reciprocable thereby, a first die set and a second die set mounted one above the other in said press, said die sets each comprising a die plate and a punch plate, said punch plates being connected together and to said crosshead and reciprocable simultaneously by said crosshead, means for guiding a web of gauze through said first die set, means for guiding a web of adhesive-coated fabric underneath said first die set and thereafter through said second die set, a punch carried by the punch plate of said first die set and operative to punch gauze discs out of said gauze web and to press the same onto the adhesive surface of said fabric, and means driven by said crankshaft for intermittently driving said gauze web and said fabric web each in uniform steps, the intervals of rest between said steps occurring simultaneously with the punching operations, and a punch carried by the punch plate of said second die set for punching out pieces of said fabric each carrying one of said gauze discs.

PETER S. BANFF.
VERNON HALVERSEN.

REFERENCES CITED

The following references are of record in the file of this patent:

UNITED STATES PATENTS

| Number | Name | Date |
|---|---|---|
| 1,318,714 | Anderson | Oct. 14, 1919 |
| 1,637,623 | Schmitt | Aug. 2, 1927 |
| 2,012,405 | Salfisberg | Aug. 27, 1935 |
| 2,033,736 | Perryman | Mar. 10, 1936 |
| 2,103,945 | Henley | Dec. 28, 1937 |
| 2,220,071 | Avery | Nov. 5, 1940 |
| 2,304,787 | Avery | Dec. 15, 1942 |
| 2,305,010 | Kenney | Dec. 15, 1942 |
| 2,320,092 | Miller | May 25, 1943 |
| 2,392,695 | Rohdin | Jan. 8, 1946 |
| 2,435,376 | Wilcoxon | Feb. 3, 1948 |

FOREIGN PATENTS

| Number | Country | Date |
|---|---|---|
| 402,361 | Great Britain | Nov. 30, 1933 |